(12) United States Patent
Sil et al.

(10) Patent No.: US 9,244,183 B2
(45) Date of Patent: Jan. 26, 2016

(54) FRACTURE CHARACTERIZATION FROM REFRACTION TRAVEL TIME DATA

(71) Applicant: CONOCOPHILLIPS COMPANY, Houston, TX (US)

(72) Inventors: Samik Sil, Houston, TX (US); Ali Tura, Houston, TX (US); Roman Kazinnik, Houston, TX (US); Xinfa Zhu, Dallas, TX (US)

(73) Assignee: ConocoPhillips Company, Houston, TX (US)

( * ) Notice: Subject to any disclaimer, the term of this patent is extended or adjusted under 35 U.S.C. 154(b) by 380 days.

(21) Appl. No.: 13/772,570

(22) Filed: Feb. 21, 2013

(65) Prior Publication Data

US 2014/0133273 A1    May 15, 2014

Related U.S. Application Data

(60) Provisional application No. 61/725,285, filed on Nov. 12, 2012.

(51) Int. Cl.
*G01V 1/30* (2006.01)

(52) U.S. Cl.
CPC *G01V 1/303* (2013.01); *G01V 1/30* (2013.01); *G01V 2210/52* (2013.01); *G01V 2210/626* (2013.01); *G01V 2210/646* (2013.01)

(58) Field of Classification Search
CPC ..... G01V 1/303; G01V 1/30; G01V 2210/52; G01V 2210/626; G01V 2210/646
USPC .................................. 367/36, 52, 53
See application file for complete search history.

(56) References Cited

U.S. PATENT DOCUMENTS

| | | | | |
|---|---|---|---|---|
| 4,069,471 | A * | 1/1978 | Silverman | 367/54 |
| 5,671,136 | A * | 9/1997 | Willhoit, Jr. | 702/18 |
| 5,808,963 | A * | 9/1998 | Esmersoy | 367/31 |
| 6,864,890 | B2 | 3/2005 | Meek et al. | |
| 6,904,368 | B2 | 6/2005 | Reshef et al. | |
| 8,077,546 | B2 | 12/2011 | Hansteen et al. | |
| 2003/0198132 | A1* | 10/2003 | Kappius et al. | 367/43 |
| 2007/0294036 | A1* | 12/2007 | Strack et al. | 702/14 |
| 2012/0106292 | A1* | 5/2012 | Fuller et al. | 367/27 |

FOREIGN PATENT DOCUMENTS

CN    102053260    5/2011

OTHER PUBLICATIONS

Diebold and Stoffa, "The traveltime equation, tau-p. mapping, and inversion of common midpoint data," Geophysics, 46:238-254 (1981).

(Continued)

*Primary Examiner* — Daniel L Murphy
(74) *Attorney, Agent, or Firm* — ConocoPhillips Company

(57) ABSTRACT

Refracted energy travel time can help to derive anisotropic parameters in a target layer. These anisotropic parameters allow us to both explore for new reservoirs and to understand stress and fracturing in existing reservoirs. This information can be used to i) detect oil reservoirs, ii) spot naturally fractured, hence high production zones, iii) detect dominant natural stress directions, iv) better place horizontal wells to optimize production, v) monitoring man made fractures or induced directional stress changes. The method is demonstrated using synthetic and real data.

15 Claims, 6 Drawing Sheets

(56) References Cited

OTHER PUBLICATIONS

Landro, et al., "Seismic critical-angle reflectometry: A method to characterize azimuthal anisotrophy?" Geophysics, vol. 72, No. 3 (May Jun. 2007) p. D41-D50.

Sil and Sen, "Seismic critical-angle anisotrophy analysis in the t-p. domain" Geophysics, vol. 74, No. 4 (Jul.-Aug. 2009) p. A53-A57.

Zadeh, et al., "4D critical angle analysis using Valhall LoFS data" SEG Expanded Abstracts 29, 4145 (2010).

Hansteen, et al., "Time-lapse Refraction Seismic Monitoring" SEG Expanded Abstracts 29, 4170 (2010). 72nd EAGE Conference & Exhibition, Barcelona, Spain, paper B033.

Hansteen, et al., "Refraction Monitoring Shows Promise in Heavy Oil Field," Hart's E & P, vol. 84, No. 3, Notes 52-33, 2011.

* cited by examiner

FRACTURE CHARACTERIZATION FROM REFRACTION TRAVEL TIME DATA

CROSS-REFERENCE TO RELATED APPLICATIONS

This application is a non-provisional application which claims benefit under 35 USC §119(e) to U.S. Provisional Application Ser. No. 61/725,285 filed Nov. 12, 2012, entitled "FRACTURE CHARACTERIZATION FROM REFRACTION TRAVEL TIME DATA," which is incorporated herein in its entirety.

STATEMENT REGARDING FEDERALLY SPONSORED RESEARCH

None.

FIELD OF THE INVENTION

Seismic refraction data analysis for fracture characterization has been developed. In one embodiment, the azimuthal variation of refracted travel time is used as a method to detect and show influence of azimuthal anisotropy. This aids in the detection of fractured or stressed zones and can be used to monitor reservoir and overburden fractures or stress state.

BACKGROUND OF THE INVENTION

Many reservoirs in the world are stressed and/or fractured in nature. Characterization of those stresses and/or fractures can help to detect an oilfield. Further, it can help to optimize well placement and increase productivity of existing fields. One way of characterizing stresses and fractures of the subsurface reservoirs is using well log data. But generally well log data gives limited information in a field to a region around the well and therefore has limited spatial resolution. On the other hand, seismic data samples the entire reservoir spatially. Therefore, estimation of stress and fracture parameters using seismic data is an important development.

One way of seismically characterizing stress and fractures is by detecting and analyzing seismic anisotropy. Presence of horizontal stress differential and/or vertical fractures with nearly uniform strike direction makes a medium transversely isotropic with horizontal axis of symmetry (HTI). HTI medium shows simplest form of azimuthal anisotropy with respect to seismic wave propagation. Generally, seismic waves travel faster along the fracture strike direction and slower perpendicular to the strike direction of the fractures in an HTI medium. Utilizing this property, in current practice, travel time and amplitude (separately and/or together) variation of reflected seismic energy with azimuth is used to characterize fracture property from seismic data (both travel time and amplitude).

While reflected energy only samples a small area in the Fresnel zone from the target layer, refraction energy samples significantly more area of the target layer as it travels long distances in the target layer. Therefore, effect of anisotropy is significantly more pronounced on the refracted wave than the reflected wave from the target fractured layer. Hence, one can argue that the refracted energy analysis should provide better understanding of azimuthal seismic anisotropy than reflected energy. The uses of refracted energy to characterize fractures are very uncommon and there is a need to develop a methodology to characterize seismic anisotropy using refracted seismic energy. Theoretically, Landro and Tsvankin (2007), Sil and Sen (2009) show that, some properties of the refracted energy (e.g. critical angle, critical offset etc) vary with azimuth in an azimuthally anisotropic medium. Even though most of the time reflected seismic energy is used to characterize fractures, use of refracted energy to characterize fractures is still uncommon. Previously, refraction travel time variation to determine anisotropy as discussed.

There is a need to develop a methodology to characterize seismic anisotropy using refracted seismic energy.

BRIEF SUMMARY OF THE DISCLOSURE

A method of azimuthal anisotropy property estimation which is linked to a fractured or differential stress system is presented from refraction seismic data. The method is demonstrated on multi-azimuth refracted data from a synthetic model generated by a one dimensional reflectivity code. Using these synthetics it has been shown that (1) refracted waves carry significant information from the anisotropic target and can be detected in the difference plot of different azimuth data, (2) velocity of refracted waves vary with azimuth significantly, and (3) we can estimate anisotropic parameters using refracted waves from the multi-azimuth travel time data.

A work flow is developed to determine anisotropic parameters and fracture strike directions at the target level. This information can be used to i) detect oil reservoirs, ii) spot naturally fractured, hence high production zones, iii) detect dominant natural stress directions, iv) better place horizontal wells to optimize production, v) monitoring man made fractures or induced directional stress changes. Combined with horizontal drilling technology, this can dramatically and positively change the economics of conventional and unconventional resource plays.

The disclosure more particularly includes determination of anisotropic parameter (Thomsen, 1986, and Rüger, 2001) and fracture strike direction at each refraction bin in the reservoir. The concept of Common Refraction Point (CRP) is defined in this process.

In one embodiment, fractures are identified in a hydrocarbon reservoir by transmitting seismic source signals into the earth; receiving seismic signals with two or more geophones in different azimuth; recording source-receiver records to a computer processor comprising a user interface and a storage medium; pre-processing each pair of source-receiver records for each azimuth around one or more common source signals, including: applying linear move-out, removing dipping signals, extracting refraction travel time, and removing linear move-out; deriving anisotropic parameters from refraction travel time; and correlating changes in anisotropic parameters to one or more reservoir models.

In another embodiment, fractures are identified in a hydrocarbon reservoir by transmitting two or more seismic signals into a seismic reservoir; receiving two or more seismic signals at one or more geophones; recording source-receiver records to a computer processor comprising a user interface and a storage medium; pre-processing each pair of source-receiver records for each azimuth around one or more common receivers, including: applying linear move-out, removing dipping signals, extracting refraction travel time, and removing linear move-out; deriving anisotropic parameters from refraction travel time; and correlating changes in anisotropic parameters to one or more reservoir models.

In yet another embodiment, fractures are identified in a hydrocarbon reservoir by transmitting two or more seismic signals into a seismic reservoir; receiving two or more seismic signals at two or more geophones; recording source-receiver records to a computer processor comprising a user interface and a storage medium; binning multiple source-receiver records in which the refracted wave passes through a common point in the target reservoir, pre-processing each pair of source-receiver records for each azimuth, including: applying linear move-out, removing dipping signals, extracting refraction travel time, and removing linear move-out; derive anisotropic parameters from refraction travel time; and correlating changes in anisotropic parameters to one or more reservoir models.

In some instances a different wave-mode may be used to record anisotropic seismic signals. Typically this method may be applied when a lower velocity overburden exists; when the reservoir has a small critical angle; and/or when the refractions have narrow incidence angles. Additionally multiple azimuths may be plotted simultaneously in a difference plot to identify areas of higher fracturing. A grid search and/or optimization algorithm may be applied to derive and/or invert one or more anisotropic parameters.

This method requires a relatively faster seismic velocity in the target layer than its overburden in order to obtain a refracted energy from the target layer. In certain cases, assuming vertically propagated fractured zones or vertical continuity of the stresses, the method can be applied to shallower faster layers to infer information about a deeper target that may not itself provide refractions.

BRIEF DESCRIPTION OF THE DRAWINGS

A more complete understanding of the present invention and benefits thereof may be acquired by referring to the follow description taken in conjunction with the accompanying drawings in which.

Length of the arrow is proportional to the value of $\epsilon$ and direction points to fracture strike direction.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Figure 1:
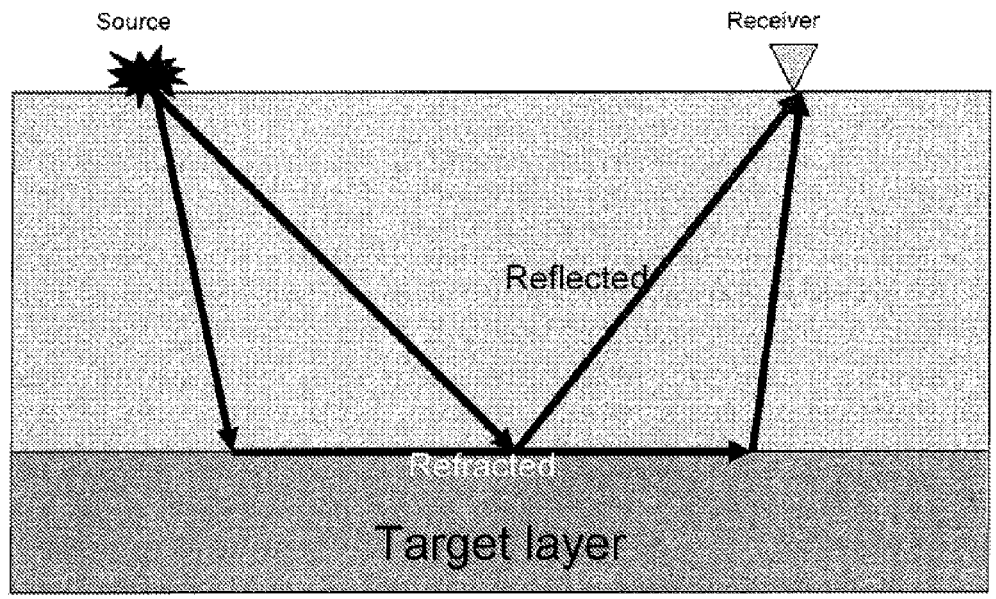
FIG. 1: Illustration of reflected and refracted waves. Refracted wave travels horizontally along the interface with the velocity of the target layer. Reflected wave only reflects from a narrow Fresnel zone at the target layer.

As shown in FIG. 1, the travel path of reflected and refracted waves from a target horizon (or reservoir). Upon reaching the target medium the refracted energy travels in the target layer and as a result refracted waves carry much more travel time and amplitude information about the target layer than the reflected wave which just reflects locally off the top of the layer. The main condition to reach the critical angle and form refracted waves is that the P-wave velocity above the target layer is slower than the P-wave velocity in the target layer.

Figure 2:
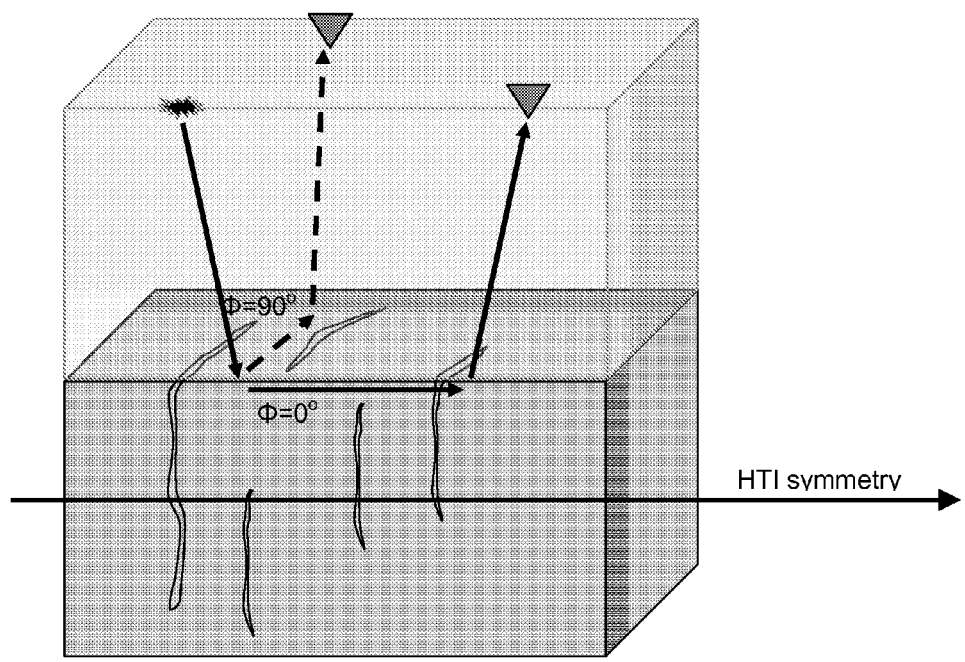
FIG. 2: Illustration of variation of direction of refracted wave from one shot (dot) to two receivers (triangles) in an HTI medium. Receiver along the 0° azimuth direction is parallel to the HTI symmetry axis (slower velocity); Receiver along the 90° azimuth direction is perpendicular to the symmetry axis (faster velocity).

In a 3D shooting geometry, the energy from each source will propagate in different azimuthal directions. FIG. 2 shows how refracted energy will travel in two different azimuth directions in a 3D geometrical setting. If the target layer is an HTI medium, refracted waves will travel faster along 90° azimuth (fracture strike or maximum horizontal stress direction), and slower along 0° azimuth (perpendicular to the fast direction). Here the azimuths are with respect to the symmetry axis of an HTI medium.

Figure 3:
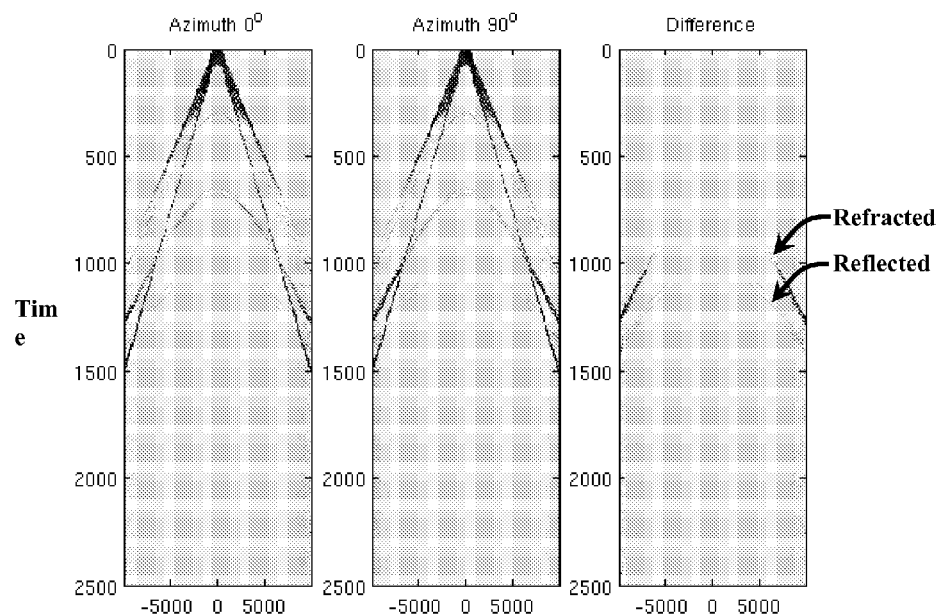
FIG. 3: Synthetic seismogram for 0 degree azimuth (w.r.t. HTI symmetry axis) slow direction (left panel), 90 degree azimuth fast direction (middle panel) and their difference (right panel) for an isotropic overburden and HTI target layer. Difference plot helps to identify strong linear refracted signals in large offset due to anisotropy (between 1000 to 1250 ms, in right panel). We also see much weaker reflected signals due to anisotropy just after the refracted signal.

The effect of anisotropy recorded from these two azimuthal directions will be captured in the refracted wave travel times. To demonstrate this: FIG. 3 shows a plot of synthetic seismograms for a multi-layered case, where the overburden is isotropic and the target layer is HTI. Left panel of FIG. 3 shows synthetic P-wave seismograms from the 0° azimuth, middle panel shows the synthetic P-wave seismogram for the 90° azimuth, and the left panel shows the difference between them. It is clear from this plot that the difference (signature of anisotropy) is more for the refracted energy than the reflected energy. This phenomenon is true for any azimuthally anisotropic medium and not affected by the overburden even if it is anisotropic. This is also true for any other mode of waves (converted, shear, surface wave etc).

Materials and Methods

Figure 4:
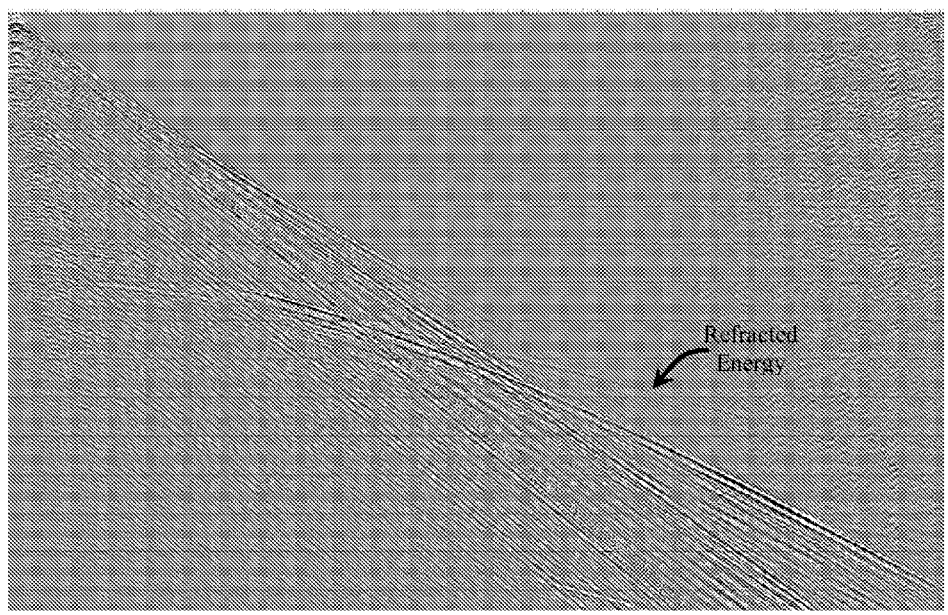
FIG. 4: A typical seismic receiver gather from field data showing the refracted energy from the reservoir.

A standard work flow of estimating seismic fracture parameters (seismic anisotropy parameters) is described below. FIG. 4, shows a typical vertical component receiver gather seismic data recorded in a 3 component receiver. Note that the observed data does not require any special instrumental arrangement, and can be recorded in any standard recording systems (e.g. single component, multi-component, ocean bottom node etc). Refracted energy is clearly observed in this receiver gather from the target reservoir. Some pre-processing is applied before extracting the refracted travel time from the observed signal.

Pre-processing steps include (but not limited to) application of linear move out (estimated from the slope of the refracted signal or from external information of the velocity of the target layer), applying frequency-wavenumber (or other) filtering to remove dipping signals, extraction of travel time (using first break picking, or cross correlation or other technique), and removal of the applied linear move out. This process is repeated for every pair of source and receiver for every azimuth (where refraction signal is visible). Additionally, preprocessing may be required to remove heterogeneity in the overburden and dip correction for reservoir features.

Extracted refraction travel time information is used to derive the anisotropic parameters and fracture characterization.

Amongst many potential methods, we show two different methods that are used to extract anisotropic information from the collected refracted travel time data.

Figure 5:
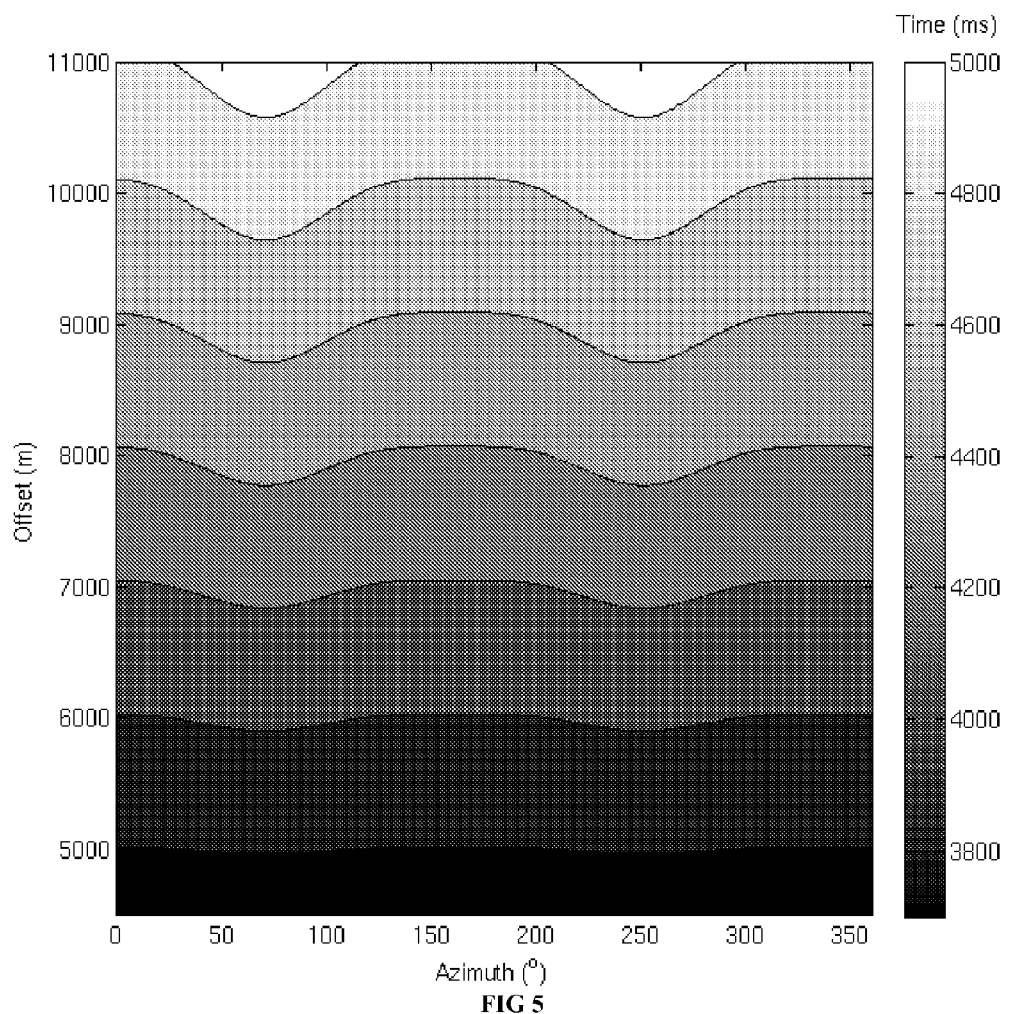
FIG. 5: Variation of refracted P-wave travel time with offset and azimuth for a common receiver gather.
Figure 6:
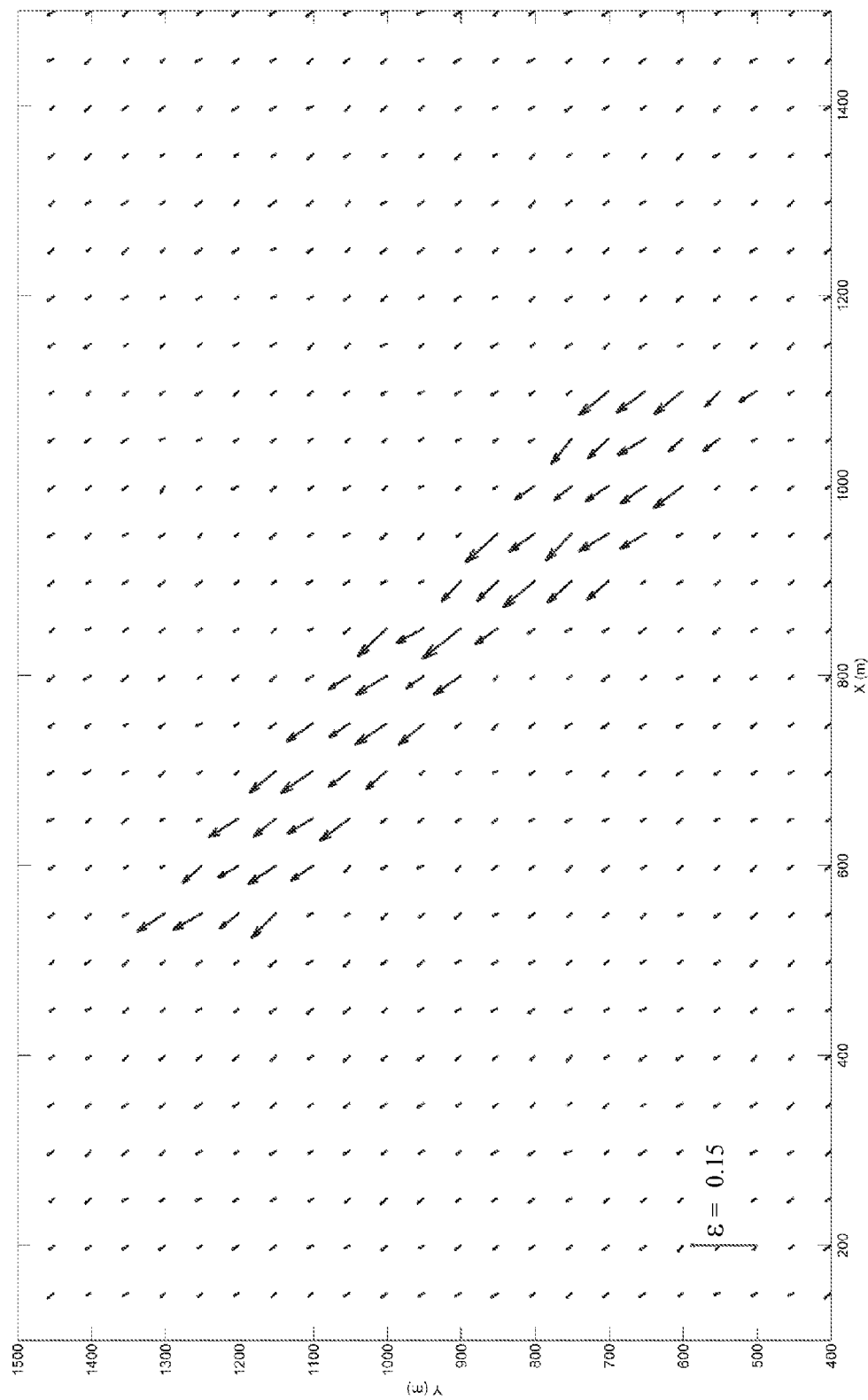
FIG. 6: Derived anisotropic parameter $\epsilon$ and fracture strike direction over the target reservoir map. Length of the arrow is proportional to the value of $\epsilon$ (strength of anisotropy) and direction points to fracture strike direction.

Method 1:

In the first method observed refracted travel times are sorted based on one receiver and multiple shot offsets and azimuths (FIG. 5). Then using an equation derived by Sil and Sen (2009) anisotropic parameter $\epsilon$ (a measure of fracture strength) and fracture strike direction is derived for the receiver location. A grid search algorithm is applied in this case to derive these parameters. Note that any inversion/optimization method can be used to derive those parameters from the extracted data shown in FIG. 5. Similarly the extraction method is not limited to the equation derived by Sil and Sen (2009). Any other complicated or simple form of equation describing refracted travel time variation with azimuth for an anisotropic medium (e.g. Landro and Tsvankin, 2007) can be used for this purpose. Extracted fracture strike and $\epsilon$ values at each receiver location are plotted over the reservoir in FIG. 6.

Figure 7:
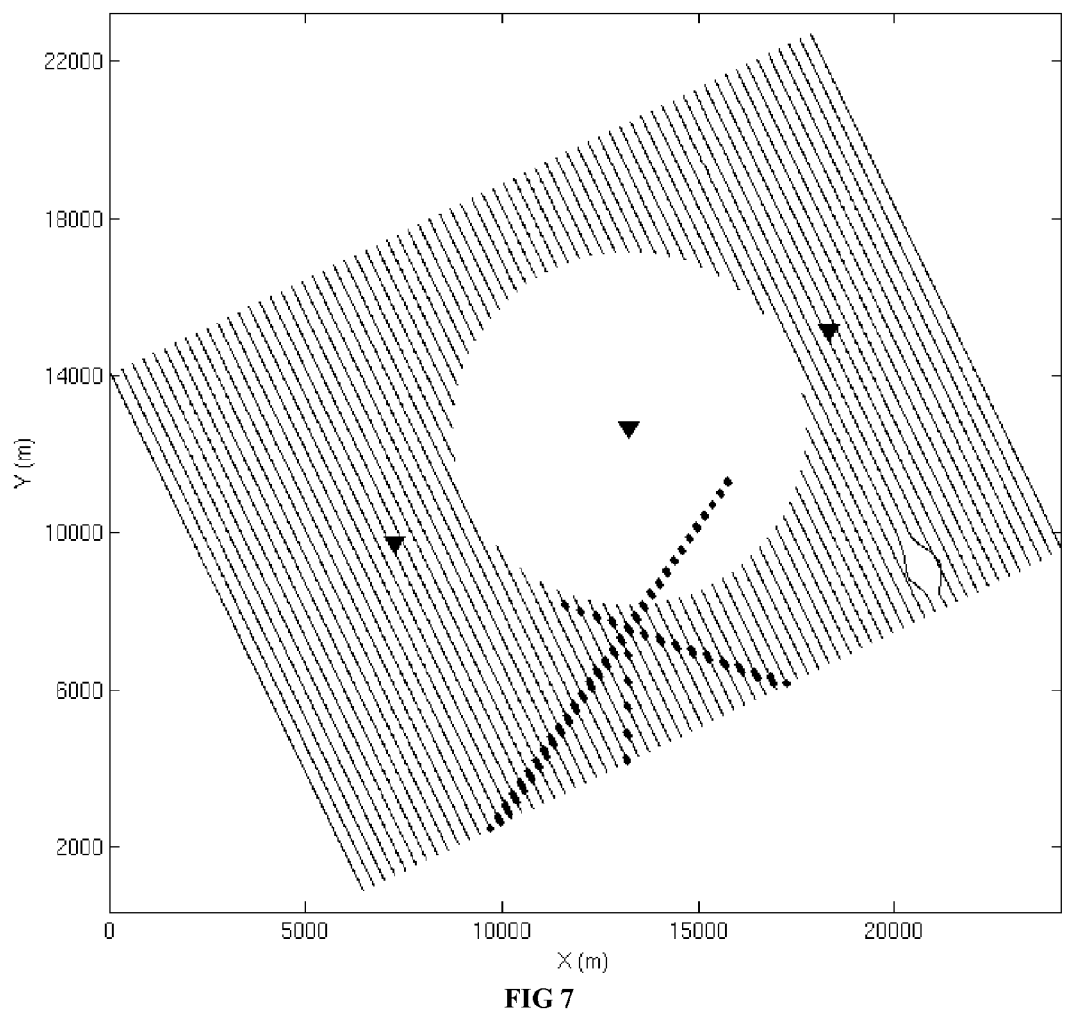
FIG. 7: A schematic for generating one Common Refraction Point (CRrP). Parallel NW-SE lines are all the shots and triangles show three example receivers. For each receiver, a line of shots with different azimuths is highlighted as bold dots. The intersection of three lines (bold dots) indicates a CRrP location.
Figure 8:
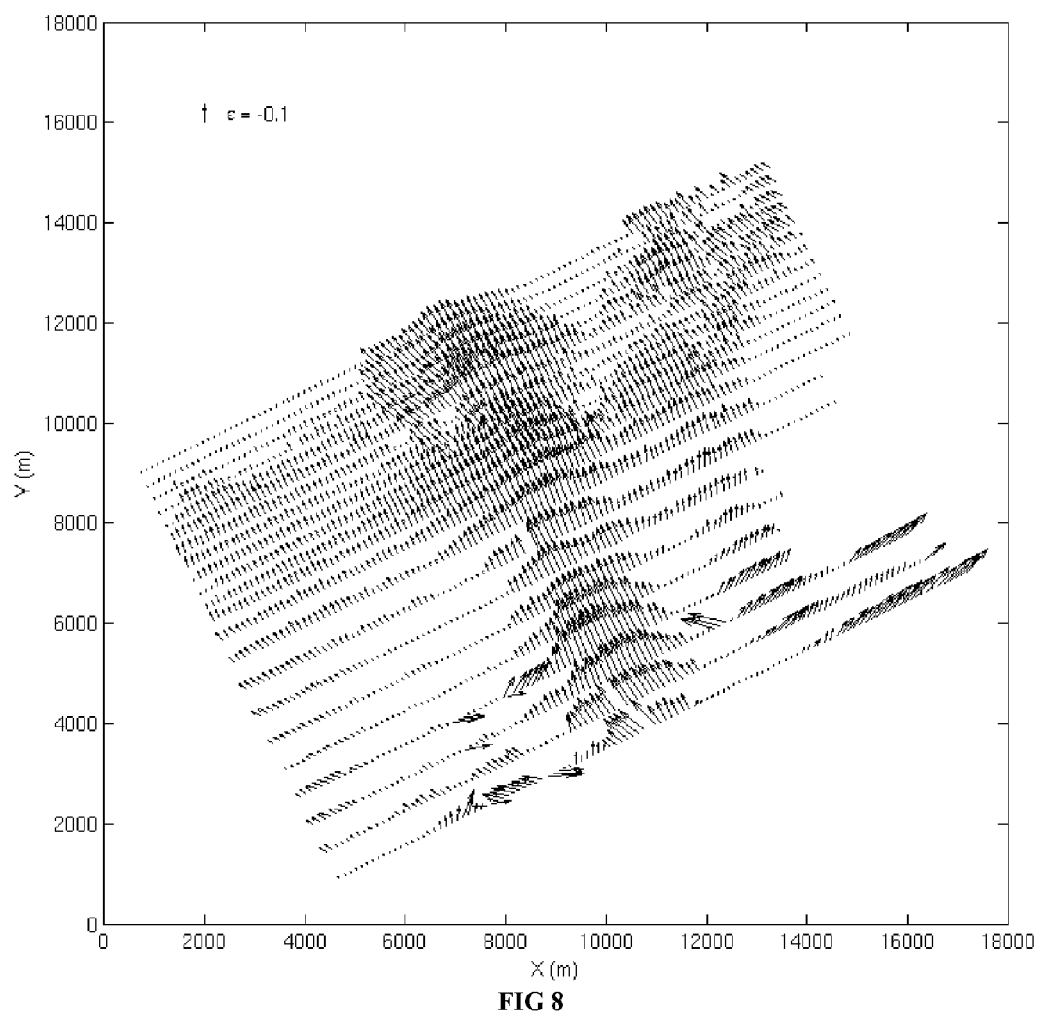
FIG. 8: Derived anisotropic parameter $\epsilon$ and fracture strike direction over the target reservoir map using CRrP technique.

Method 2:

In another embodiment a different sorting technique is used to derive anisotropic (and fracture) parameters more precisely. In this sorting or binning technique data is selected from multiple shots and receivers such that the refracted wave passes through a common point in the target reservoir in different directions or azimuths. This point is called Common Refraction Point (CRrP). FIG. 7 shows a simplified example of the method with only 3 receivers. For each receiver, a line of shots along three different azimuths is selected. The intersection of the three lines indicates the considered CRrP location with refraction travel time data from three azimuths. In practice this is actually applied to all the relevant receivers with refractions to get anisotropy information from a large range of azimuths making the inversion for anisotropy strength and direction robust at each CRrP location. The advantage of the CRrP technique is it sees variation of velocity with azimuth in a considerably smaller or localized area. Once data is selected for each CRrP the same optimization (grid search) technique as in Method 1 can be applied to detect anisotropic parameters and displayed in the same manner (FIG. 8).

It has been shown that: 1) refracted travel time contains HTI anisotropy signals from a target anisotropic layer, 2) Refracted travel times vary with azimuth due to azimuthal anisotropy in the target layer, 3) Two methods to robustly obtain anisotropic parameter $\epsilon$ and fracture direction from the refracted wave is demonstrated.

In closing, it should be noted that the discussion of any reference is not an admission that it is prior art to the present invention, especially any reference that may have a publication date after the priority date of this application. At the same time, each and every claim below is hereby incorporated into this detailed description or specification as a additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein.

It is the intent of the inventors that variations and equivalents of the invention are within the scope of the claims while the description, abstract and drawings are not to be used to limit the scope of the invention. The invention is specifically intended to be as broad as the claims below and their equivalents.

REFERENCES

All of the references cited herein are expressly incorporated by reference. The discussion of any reference is not an admission that it is prior art to the present invention, especially any reference that may have a publication data after the priority date of this application. Incorporated references are listed again here for convenience:

1. U.S. Pat. No. 6,864,890, US2004041815, "Method of building and updating an anisotropic velocity model for depth imaging of seismic data," Meek and Anno, ConocoPhillips Co. (2002).
2. U.S. Pat. No. 6,904,368, U.S. Pat. No. 7,355,923, US2004093163, US2005207278, WO2004044617, "Seismic analysis using post-imaging seismic anisotropy corrections," Reshef, et al., Landmark Graphics Corp. (2002).
3. U.S. Pat. No. 8,077,546, US20090274005, "Method for monitoring a multi-layered system," Hansteen and Wills, Shell Int. Res. (2008).
4. US-2012-0250459, EP2506039 "Methods for Seismic Fracture Parameter Estimation and Gas Filled Fracture Identification from Vertical Well Log Data," Sil, et al., ConocoPhillips Co. (2011).
5. U.S. Ser. No. 13/656,001, "Fracture Identification From Azimuthal Migrated Seismic Data," Zhou and Sil, ConocoPhillips Co. (2011)
6. CN102053260, "Method for acquiring azimuth velocity of primary wave and method for processing earthquake data," Tang and Ma, China Petroleum & Chemical (2009).
7. Diebold and Stoffa, "The traveltime equation, tau-p mapping, and inversion of common midpoint data," Geophysics, 46:238-254 (1981).
8. Landro, et al., "Seismic critical-angle reflectometry: A method to characterize azimuthal anisotrophy?" Geophysics, Vol. 72, No. 3 (MayJune 2007) P. D41-D50
9. Sil and Sen, "Seismic critical-angle anisotrophy analysis in the $\tau$-p domain" Geophysics, Vol. 74, No. 4 (July-August 2009) p. A53-A57.
10. Zadeh, et al., "4D critical angle analysis using Valhall LoFS data" SEG Expanded Abstracts 29, 4145 (2010).
11. Hansteen, et al., "Time-lapse Refraction Seismic Monitoring" SEG Expanded Abstracts 29, 4170 (2010). 72nd EAGE Conference & Exhibition, Barcelona, Spain, paper B033
12. Hansteen, et al., "Refraction Monitoring Shows Promise In Heavy Oil Field,"

The invention claimed is:

1. A method to identify fractures in a hydrocarbon reservoir comprising:
   transmitting one or more seismic source signals into the earth;
   receiving one or more seismic signals at two or more geophones;
   recording source-receiver records to a computer processor comprising a user interface and a storage medium;
   pre-processing each pair of source-receiver records for each azimuth around one or more common source signals, including:
      applying linear move-out,
      removing dipping signals, extracting refraction travel time, and
removing linear move-out;
deriving anisotropic parameters from refraction travel time; and
correlating changes in anisotropic parameters to one or more reservoir models.

2. The method of claim 1, wherein a different wave-mode is used when compared to conventional seismic.

3. The method of claim 1, comprising one or more of the following conditions:
a) wherein a lower velocity overburden exists;
b) wherein the reservoir has a small critical angle; or
c) wherein the refractions have narrow incidence angles.

4. The method of claim 1, wherein multiple azimuths are plotted simultaneously in a difference plot.

5. The method of claim 1, wherein a grid search algorithm, optimization algorithm or both are applied to derive or invert one or more anisotropic parameters.

6. A method to identify fractures in a hydrocarbon reservoir comprising:
transmitting two or more seismic signals into a seismic reservoir;
receiving two or more seismic signals at one or more geophones;
recording source-receiver records to a computer processor comprising a user interface and a storage medium;
pre-processing each pair of source-receiver records for each azimuth around one or more common receivers, including:
applying linear move-out,
removing dipping signals,
extracting refraction travel time, and
removing linear move-out;
deriving anisotropic parameters from refraction travel time; and
correlating changes in anisotropic parameters to one or more reservoir models.

7. The method of claim 6, wherein a different wave-mode is used when compared to conventional seismic.

8. The method of claim 6, comprising one or more of the following conditions:
a) wherein a lower velocity overburden exists;
b) wherein the reservoir has a small critical angle; or
c) wherein the refractions have narrow incidence angles.

9. The method of claim 6, wherein multiple azimuths are plotted simultaneously in a difference plot.

10. The method of claim 6, wherein a grid search algorithm, optimization algorithm or both are applied to derive or invert one or more anisotropic parameters.

11. A method to identify fractures in a hydrocarbon reservoir comprising:
transmitting two or more seismic signals into a seismic reservoir;
receiving two or more seismic signals at two or more geophones;
recording source-receiver records to a computer processor comprising a user interface and a storage medium;
binning multiple source-receiver records in which the refracted wave passes through a common point in the target reservoir,
pre-processing each pair of source-receiver records for each azimuth, including:
applying linear move-out,
removing dipping signals,
extracting refraction travel time, and
removing linear move-out;
deriving anisotropic parameters from refraction travel time; and
correlating changes in anisotropic parameters to one or more reservoir models.

12. The method of claim 11, wherein a different wave-mode is used when compared to conventional seismic.

13. The method of claim 11, comprising one or more of the following conditions:
a) wherein a lower velocity overburden exists;
b) wherein the reservoir has a small critical angle; or
c) wherein the refractions have narrow incidence angles.

14. The method of claim 11, wherein multiple azimuths are plotted simultaneously in a difference plot.

15. The method of claim 11, wherein a grid search algorithm, optimization algorithm or both are applied to derive or invert one or more anisotropic parameters.

* * * * *